May 11, 1954   B. E. WATT   2,678,440
AIRBORNE MOVING TARGET INDICATING RADAR SYSTEM
Filed March 26, 1946

INVENTOR
BOB E. WATT
BY
William D. Hall
ATTORNEY

Patented May 11, 1954

2,678,440

UNITED STATES PATENT OFFICE 2,678,440

AIRBORNE MOVING TARGET INDICATING
RADAR SYSTEM

Bob E. Watt, Tulsa, Okla., assignor, by mesne assignments, to the United States of America as represented by the Secretary of War Application March 26, 1946, Serial No. 657,141

5 Claims. (Cl. 343—7.7)

This invention relates to radar or radio object locating systems and more particularly to such systems which are adapted to provide an indication of objects which are moving relative the radar system.

In the copending application of Robert H. Dicke entitled Communication System, Serial No. 590,052, filed April 24, 1945, which was issued December 26, 1950, as Patent No. 2,535,274, a radio object locating system is described which will provide an indication of targets or other objects which are moving relative to the system. The term target as hereinafter used includes all objects. Echoes returned from moving targets are distinguished from echoes returned from stationary targets by employing in the radar system a coherent oscillator hereinafter called coho oscillator, which is locked in phase with the carrier of each transmitted exploratory pulse. Coherent oscillators are well known in the art and may be defined as oscillators producing heterodyning oscillations which are locked in phase with the carrier oscillations at the beginning of each transmitted exploratory pulse. The terms coherent oscillator and coherent oscillations in the specification and claims are used with this meaning. The frequency of the coho oscillator may be different from the frequency of the transmitted signal provided that within the system there is a third signal of such a frequency that if the coho signal and the third signal are combined in a non-linear mixer the resulting signal having a frequency which is the sum of the two signals will have the same frequency as the transmitted signal and will, on successive transmitted signals, bear a fixed phase relationship thereto. The coho oscillator signal is combined with the returned echo signals which have been previously reduced in such a manner that their carrier frequency is substantially equal to the frequency of the coho oscillator. The signals resulting from this last mentioned combination which are derived from targets having no motion relative to the radar system will, due to their constant phase relationship to the coho signal, be of constant amplitude throughout successive signals. The resulting signals which are derived from targets having motion relative to the radar system will, due to their changing phase relative to the coho signal, vary in amplitude throughout successive signals. By means of a suitable comparator circuit the signals which vary in amplitude are separated out and utilized to provide moving target indication. The comparator circuit may include a delay line whose time length is equal to the time interval between transmitted signals, in which instance successive returned echo signals from any specified target, after combination with the coho signal, are compared in an algebraic manner with corresponding signals returned at a previous time. Only those signals which change in amplitude from echo to echo result in an output from the comparator and these signals represent targets having motion relative to the radar system. Any other means well known in the art may be used to distinguish between signals of varying amplitude and signals of constant amplitude, for example, the modulation envelope of signals returned from any specified target may be detected.

In radar systems which are mounted in a carrier such as an aircraft or ship, those targets which do not move relative to the earth do move relative to the carrier, and when the radar system is adapted to indicate targets which have motion relative to the radar system the earth, as well as stationary targets on the earth, appear as moving targets thereby giving false indications and, in many instances, obscuring moving targets which it is desired to observe.

It is an object of the present invention therefore, to provide a method for the cancellation of signals in a moving target indication radar system which are returned from targets having a predetermined velocity relative to the radar system.

It is a further object of the present invention to provide a method for the cancellation of signals in a moving target indication radar system which are returned from targets having a velocity relative to the radar system which is equal to the ground speed of the radar carrier.

It is a still further object of the present invention to provide a method for the cancellation of signals in a moving target indication radar system which are returned from targets which have no motion relative to the earth.

For a better understanding of the invention together with other and further objects thereof reference is had to the following description which is to be read in connection with the accompanying drawing in which.

Figure 1:
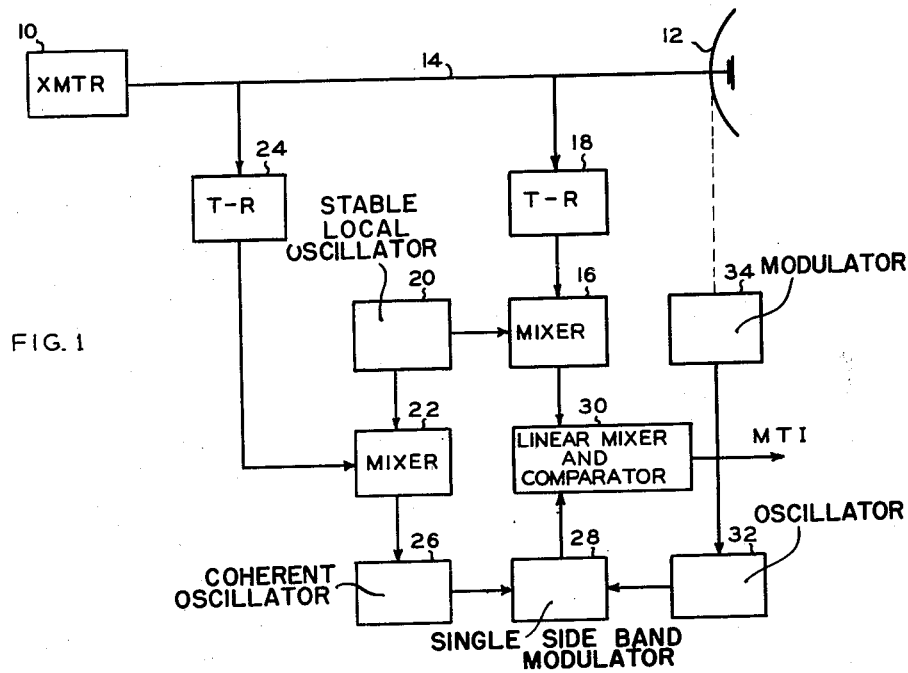
Fig. 1 is a block diagram of a radar or radio object locating system which illustrates one embodiment of the present invention.

Referring now to the drawing and more particularly to Fig. 1 thereof there is shown a moving target indicating radar system embodying the method of the present invention in the cancellation of certain targets having motion relative to the radar system. In Fig. 1 a transmitter 10 is connected electrically to a directive antenna 12 by means of a suitable transmission line 14. The antenna 12 is electrically connected for received signals to a mixer 16 through a transmitreceive (T–R) device 18. The T–R device 18 is essentially an amplitude discriminator which prevents transmitted signals, which have a much greater amplitude than received signals, from reaching the mixer 16. A stable local oscillator 20 is electrically connected to the mixer 16 and to a second mixer 22. The mixer 22 is connected to the transmitter 10 through a second T–R device 24. The output of the mixer 22 is fed to a coherent (coho) oscillator 26 in such a manner as to control the phase of the signal produced thereby. The output of the coho oscillator 26 is fed to a single side band modulator 28 the output of which is in turn fed to a linear mixer and comparator circuit 30. A second input to the linear mixer and comparator circuit 30 is provided from the mixer 16. A second input to the single side band modulator 28 is provided from an oscillator 32, the frequency of oscillation of which is controlled by the output of a modulator 34 which is in turn controlled by mechanical association with the antenna 12. The single side band modulator 28 may be any circuit which is capable of combining signals of two frequencies to provide, as an output, a signal having a frequency which is either the sum or the difference of the frequencies of the input signals.

The operation of the apparatus illustrated by Fig. 1 will be first described assuming that the single side band modulator 28, the oscillator 32 and the modulator 34 are omitted and that the output of the coho oscillator 26 is fed directly to the linear mixer and comparator 30. The transmitter 10 periodically transmits via the transmission line 14 and antenna 12 high frequency high-power exploratory pulses of electromagnetic energy. This signal is prevented from reaching the mixers 16 and 22 in damaging magnitude by the T–R devices 18 and 24, respectively. A signal of small magnitude is, however, passed by the T–R devices 18 and 24 and that signal which reaches the mixer 22 is combined with the continuous wave signal from the stable local oscillator 20. The resulting output signal from the mixer 22 will have the proper phase and frequency to satisfy the conditions set forth above for the coho signal. The output signal from the mixer 22 is applied to the coho oscillator 26 in such a manner that the phase and frequency of the output signal of the coho oscillator 26 is identical with the phase and frequency of the output signal from the mixer 22. There are several ways in which the phase and frequency of the signal from the coho oscillator 26 may be thus controlled. For specific circuits for accomplishing these results reference is had to the copending application of Robert A. McConnell entitled Electrical Circuit, Serial No. 623,393, filed October 19, 1945, now abandoned.

The output of the coho oscillator 26 is applied, in the case here assumed, to the linear mixer and comparator 30. Signals returned from reflecting targets pass through the T–R device 18 to the mixer 16 wherein they are combined with signals from the stable oscillator 20 to produce signals having a carrier frequency which is substantially equal to the frequency of the signal from the coho oscillator 26. The output of the mixer 16 is applied to the linear mixer and comparator circuit 30. The resulting signal output labeled MTI (for moving target indication) from the linear mixer comparator 30, is derived from signals returned by targets which are moving relative to the radar system. These signals may be applied to any conventional indicator as, for example, a plan position indicator of the cathode ray tube type. The operation of the apparatus illustrated in Fig. 1 including the single side band modulator 28, oscillator 32, and modulator 34 will become evident as the description of the present invention proceeds.

Figure 2:
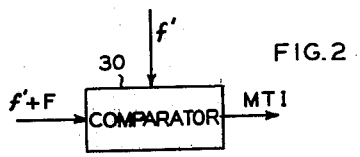
Fig. 2 is a schematic illustration of the method of velocity cancellation employed in the present invention; and, Figs. 3A, 3B, 4A, 4B and 5 are vector diagrams which serve as aids in the understanding of the invention.

Reference is now had to Figs. 2, 3A, 3B, 4A, 4B, and 5. Fig. 2 illustrates the general method of operation of the present invention in which the indications from targets moving at any specified velocity relative to the radar system are cancelled or eliminated from the normal moving target indication. In Fig. 2 a signal of frequency $f'$ is applied to the comparator 30 and represents signals returned from targets surrounding the radar system. The frequency $f'$ may be at any desired level, for example at the frequency of the transmitted signal or at an intermediate frequency. A second signal having a frequency $f'+F$ is also applied to the comparator 30. The frequency $f'$ is as described above and the frequency $F$ is of a value such that the desired moving target signals are eliminated from the moving target indication. The derivation of the value of the frequency $F$ will now be given.

Figures 3A, 3B:
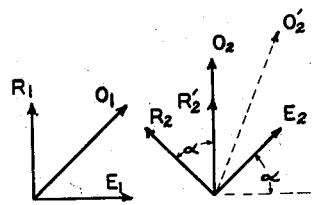

In Fig. 3A the vector $E_1$ represents the magnitude and phase of a signal returned from a given moving target. The vector $R_1$ represents the phase and magnitude of the reference or coho signal with which the returned signals are combined. The vector $O_1$ represents in phase and magnitude the signal resulting from the combination of the signals represented by vectors $E_1$ and $R_1$. In Fig. 3B the vector $E_2$ represents in phase and magnitude the signal returned from the same moving target due to incidence thereupon of the succeeding exploratory signal from the transmitter. The vector $E_2$ is displaced from the vector $E_1$, Fig. 3A, by an angle denoted as $\alpha$. In the normal case the reference signal with which this second returned signal is combined would have a phase and magnitude as represented by $R'_2$ and the signal resulting from the combination of the returned and the reference signal would be as represented by the vector $O'_2$. It will be seen from Figs. 3A and 3B that the vectors $O_1$ and $O'_2$ differ in magnitude and, therefore, if these signals are applied to the comparator circuit, an output signal would result. It is hereinafter assumed that the target producing the signal represented by the vectors $E_1$ and $E_2$ is one the indication of which it is desired to cancel. To provide cancellation it is necessary that the signal resulting from the combination of the signal represented by vector $E_2$ and the reference signal represented by vector $R_2$ in Fig. 3B be equal in magnitude to the signal represented by the vector $O_1$ in Fig. 3A. This is accomplished in Fig. 3B by altering the position of the reference vector from the normal position $R'_2$ to the position $R_2$. This necessitates altering the phase of the reference signal by the angle $\alpha$.

The angle $\alpha$ by which the returned signal is shifted is given by the equation (1) $$\alpha = \frac{2V_r}{\lambda f}$$

in which $V_r$ is the relative velocity of the radar system and the signal returning target, $f$ is the repetition frequency of transmission from the transmitter of the radar system and $\lambda$ is the wavelength corresponding to the frequency at which the returned signal is compared with the coho signal. As shown above, it is required that the phase of the reference signal be also shifted by the same angle $\alpha$. The phase change must be accomplished in a time interval which is equal to $1/f$ where $f$ is as defined above. The required change in phase of the reference signal is accomplished in the present invention by changing the frequency of the reference signal to a value which differs from the frequency of the returned signals.

Figures 4A, 4B:
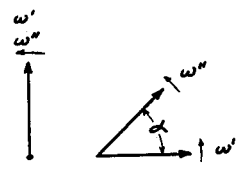

To more clearly illustrate the manner of accomplishment, reference is now had to Fig. 4A in which are shown two vectors which are in phase and which have angular velocities of $\omega'$ and $\omega''$, respectively. The vector having the velocity $\omega'$ corresponds to the normal coho signal. The vector having the velocity $\omega''$ corresponds to the new coho signal which has been altered in frequency. In Fig. 4B the vectors of Fig. 4A are illustrated after a time interval equal to $1/f$. The angle through which the vector $\omega'$ rotates in the time $1/f$ is given by (2) $\qquad \beta = (1/f)\omega' = (1/f)2\pi f'$ and the angle through which the vector $\omega''$ rotates in the time $1/f$ is given by (3) $\qquad \lambda = (1/f)\omega'' = (1/f)2\pi f''$ in which $f'' = f' + F$ and other notations previously defined are used. The difference in the phase of the two vectors represented by $\omega'$ and $\omega''$ in Fig. 4B is specified as being equal to the angle $\alpha$ which has been hereinbefore described. It will be seen therefore that (4) $\qquad \alpha = \gamma - \beta = (1/f)2\pi(f'' - f')$
$\qquad\qquad = (1/f)2\pi(f' + F - f')$
$\qquad\qquad = F2\pi/f$ From Equations 1 and 4 it is determined that (5) $\qquad F = \dfrac{V_r}{\lambda \pi}$ When the moving target indication radar system is mounted on a carrier such as an aircraft it may be desirable to provide a cancellation of the indication which would be normally produced by those objects which have a velocity relative to the aircraft which is equal to the ground speed of the aircraft. This may be accomplished by altering the coho signal frequency by an amount which is given by the Equation 5. In this instance the quantity $V_r$ becomes the ground speed of the aircraft. It can be shown that the additive frequency given by Equation 5 may be, if so desired, altered by an amount which is equal to $Nf$ where $N$ is any integer including zero.

Figure 5:
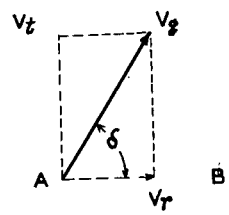

In other instances in airborne or shipborne radar systems it may be desired to eliminate from the normal moving target indication all those objects which are not moving relative to the earth. The velocities, relative to the aircraft, of the targets which are stationary relative to the earth is a function of the angular deviation of the targets from the ground track or forward line of motion of the aircraft. Referring to Fig. 5 the vector $V_g$ represents the velocity and direction of the aircraft. The aircraft is assumed to be at the point labeled A. The velocity of the aircraft, relative to a target located at B is given by the vector labeled $V_r$. The vector $V_r$ is called the radial velocity of the aircraft relative to the target at B, and the term radial velocity is used with this conventional meaning in the specification and claims. It will be seen from Fig. 5 that (6) $\qquad V_r = V_g \cos \delta$ where $V_g$ is the ground speed of the aircraft and $\delta$ is the angle between a line to the object and the ground track of the aircraft. It will be seen, therefore, that to provide cancellation of the indication normally produced by those targets which are stationary relative to the earth the value $V_r$ in Equation 5 must also satisfy Equation 6. Substituting the value of $V_r$ given by Equation 6 in Equation 5 and adding the quantity $Nf$, hereinabove described, the equation (7) $\qquad F = \dfrac{V_g \cos \delta}{\lambda \pi} + Nf$ is obtained.

Referring again to Fig. 1, the modulator 34 is mechanically associated with the antenna 12 in such a manner that it will provide an output voltage which is proportional to cosine $\delta$. The modulator 34 frequency modulates the oscillator 32 in a cosinusoidal manner such that the output frequency of the oscillator 32 at all times satisfies the Equation 7. The output signal from the oscillator 32 is combined with the coho oscillator signal in the single side band modulator 28 to provide an output signal having a frequency which may be either the sum or difference of the frequencies of the two input signals. The resulting signal, for example, having a frequency $f' + F$, is combined in the comparator 30 with signals from moving targets to provide the desired moving target indication.

The above derivation considered only one relationship between frequencies $f'$ and $f''$, that is, that condition wherein $f''$ was greater than $f'$. A similar analysis will show that $f''$ may be smaller than $f'$ by an amount which is given by the Equation 5 or 7. The apparatus of Fig. 1 illustrates the use of a single side band modulator although a conventional mixer may be employed if care is taken to properly suppress the undesired signals. Furthermore, the apparatus of Fig. 1 illustrates an embodiment of the present invention in which the indication of all targets surrounding a radar bearing aircraft which do not move relative to the earth are eliminated from the moving target indication, whereas the modulator 34 may be eliminated, if so desired, and the frequency of the output signal from the oscillator 32 may be set to a predetermined value such that the indication of targets having any predetermined velocity relative to the aircraft will be eliminated. It will be obvious that the target velocity which is cancelled need not bear any specific relationship to the velocity of the radar relative to the earth.

While there has been described what is at present considered to be a preferred embodiment of this invention, it will be obvious to those skilled in the art that various changes and modifications, in addition to those set forth in the above specification, may be made without departing from the scope of the present invention.

What is claimed is:

1. An aircraft-borne moving target indicating radio object locating system adapted to suppress indications of stationary objects, comprising means for generating and transmitting high carrier frequency radiant energy pulses, means for generating reference oscillations synchronized in phase with the carrier oscillations of said pulses, means for receiving reflected energy from objects and heterodyning said energy to a frequency substantially equal to that of said reference oscillations, an oscillator having a frequency $F$ given by the equation $$F = \dfrac{V \cos \delta}{\pi \lambda} + Nf$$

wherein N is any integer including zero, $f$ is the pulse repetition frequency of the transmitted pulses, V is the velocity of a given object with respect to the aircraft, $\lambda$ is the wavelength of reflected energy from said given object after being heterodyned, and $\delta$ is the angle between the ground track of the aircraft and the line joining the aircraft and the given object, a single side band modulator connected to said oscillator and said means for generating the reference oscillations, mixer means for comparing the single side band oscillations from said modulator and said received heterodyned signals and deriving therefrom pulses corresponding to the echoes from objects other than said given objects.

2. A moving target indicating radar system adapted to suppress indications of objects having a given velocity with respect to said system, comprising means for generating and transmitting high carrier frequency radiant energy pulses, means for generating reference oscillations synchronized in phase with the carrier oscillations of said pulses, means including a heterodyne oscillator for receiving reflected signals from objects, the sum of the frequencies of said reference oscillations and said heterodyne oscillator being equal to said carrier frequency, another oscillator having a frequency F given by the equation $$F = \frac{V}{\pi\lambda} + Nf$$

wherein N is any integer including zero, $f$ is the pulse repetition frequency of the transmitted pulses, V is the radial velocity of a given object with respect to the radar system, $\lambda$ is the wavelength of reflected signals from said given object after being heterodyned, a single side band modulator connected to said other oscillator and said means for generating the reference oscillations, mixer means for comparing the single side band oscillations from said modulator and received echo signals and deriving therefrom pulses corresponding to the echoes from objects other than said given objects.

3. A moving target indicating radar system adapted to suppress indications of objects having a given velocity with respect to said system, comprising means for transmitting high carrier frequency radiant energy pulses, means for generating reference oscillations synchronized in phase with the carrier oscillations of said pulses, means including a heterodyne oscillator for receiving reflected energy from objects, the sum of the frequencies of said reference oscillations and said heterodyne oscillator being equal to said carrier frequency, means for generating oscillations having a frequency F given by the equation $$F = \frac{V}{\pi\lambda} + Nf$$

wherein N is any integer including zero, $f$ is the the pulse repetition frequency of the transmitted pulses, and V is the radial velocity of a given object with respect to the radar system, and $\lambda$ is the wavelength of reflected energy from said given object after being heterodyned, means for deriving from said reference oscillations and said oscillation having a frequency of F, second reference oscillations having a single beat frequency thereof, mixer means for comparing said second reference oscillations and received heterodyned signals and deriving therefrom pulses corresponding to the echoes from objects other than said given objects.

4. An aircraft borne indicating radio object locating system adapted to suppress indications of stationary objects, comprising means including a directional antenna for generating and transmitting high carrier frequency radiant energy pulses, means for generating reference oscillations synchronized in phase with the carrier oscillations of said pulses, means for receiving reflected energy from objects and heterodyning said energy to a frequency substantially equal to that of said reference oscillations, an oscillator, means coupled between said antenna and said oscillator for controlling the frequency of said oscillator in accordance with the direction of said antenna, said oscillator having a frequency F given by the equation $$F = \frac{V \cos \delta}{\pi\lambda} + Nf$$

wherein N is any integter including zero, $f$ is the pulse repetition frequency of the transmitted pulses, V is the ground speed of the aircraft, $\lambda$ is the wavelength of reflected energy from said given object after being heterodyned, and $\delta$ is the angle between the direction of said antenna and the ground track of the aircraft, a single side-band modulator connected to said oscillator and said means for generating the reference oscillations, mixer means for comparing the single side band oscillations from said modulator and said received heterodyne signals and deriving therefrom pulses corresponding to the echoes from objects other than said given objects.

5. A moving target indicating radar system adapted to suppress indications of objects having a given radial velocity other than zero with respect to said system: comprising means for generating and transmitting high carrier frequency radiant energy pulses; receiving means for receiving echo signals from objects, echoes received from objects fixed relative to said radar system producing a signal in the output of said receiving means having a first given frequency and echoes received from objects moving relative to said radar system producing signals in the output of said receiving means having frequencies determined by the respective velocities of said moving objects; means for generating reference oscillations synchronized in phase with the carrier oscillations at the beginning of each of said pulses, said reference oscillations having a second given frequency differing from said first given frequency by a frequency F given by the equation $$F = \frac{V}{\pi\lambda} + Nf$$

wherein N is any integer including zero, $f$ is the pulse repetition frequency of the transmitted pulses, V is the given radio velocity, and $\lambda$ is the wavelength corresponding to said first given frequency, and mixer means for comparing the frequency of said reference oscillations and the output of said receiving means to eliminate signals from the output of said receiving means producing a zero beat when mixed with said reference oscillations.

References Cited in the file of this patent

UNITED STATES PATENTS

| Number | Name | Date |
| --- | --- | --- |
| 1,750,668 | Green | Mar. 18, 1930 |
| 2,406,316 | Blumlein et al. | Aug. 27, 1946 |
| 2,408,742 | Eaton | Oct. 8, 1946 |
| 2,423,103 | Koechlin | July 1, 1947 |
| 2,535,274 | Dicke | Dec. 26, 1950 |
| 2,548,779 | Emslie | Apr. 10, 1951 |